United States Patent

[11] 3,587,877

[72] Inventor Robert E. Hornibrook
Star Route 303, Box 6, Goldendale, Wash. 98620
[21] Appl. No. 804,441
[22] Filed Mar. 5, 1969
[45] Patented June 28, 1971

[54] BALE ACCUMULATOR AND DISCHARGER
3 Claims, 4 Drawing Figs.

[52] U.S. Cl. .................................................. 214/7, 214/501
[51] Int. Cl. .................................................. B65g 57/32
[50] Field of Search .......................................... 214/7, 6 (B), 501, 518

[56] References Cited
UNITED STATES PATENTS

| | | | |
|---|---|---|---|
| 2,732,679 | 1/1956 | McCombs | 214/6(B)UX |
| 2,948,420 | 8/1960 | Stoecker | 214/6(B) |
| 3,139,196 | 6/1964 | Legocki | 214/6(B) |
| 3,158,270 | 11/1964 | Prentice | 214/6(B) |
| RE25,750 | 3/1965 | Adams et al. | 214/6(B)X |
| 3,330,426 | 7/1967 | Bishop | 214/6(B) |
| 3,361,279 | 1/1968 | Brown et al. | 214/6(B)X |
| 3,367,518 | 2/1968 | Bishop | 214/6(B) |
| 3,402,832 | 9/1968 | Wehde | 214/6(B) |
| 3,406,840 | 10/1968 | Soteropulos | 214/6(B) |
| 3,472,398 | 10/1969 | Smith | 214/6(B)UX |

Primary Examiner—Robert G. Sheridan
Assistant Examiner—Robert J. Spar
Attorney—Kolisch & Hartwell ABSTRACT: Apparatus for accumulating a multiplicity of bales coming from a traveling baler, with the bales aligned side by side. The apparatus operates, on a predetermined number of bales being accumulated, to dump such on the ground. The apparatus includes a chute receiving bales coming from the baler and operable to turn each a quarter turn before the bale is deposited on a tilt table which extends between the sides of the accumulator. A pusher groups the bales by shifting them laterally in their quarter-turned position toward an end of the tilt table, and on a predetermined number being collected a release is actuated causing the tilt table to incline rearwardly and downwardly. The bales collect with rear ends protruding over the rear margin of the tilt table, and on tilting these rear ends contact the ground whereby with further forward movement the stack is pulled off with the bales maintaining their relative position with respect to each other. A frame mounts the various elements described, and caster wheels provide rolling support for the frame. Means is provided for connecting the accumulator to a traveling baler which maintains an axis extending from front to rear in the accumulator in a predetermined position with respect to a similar axis in a baler on the baler making a turn.

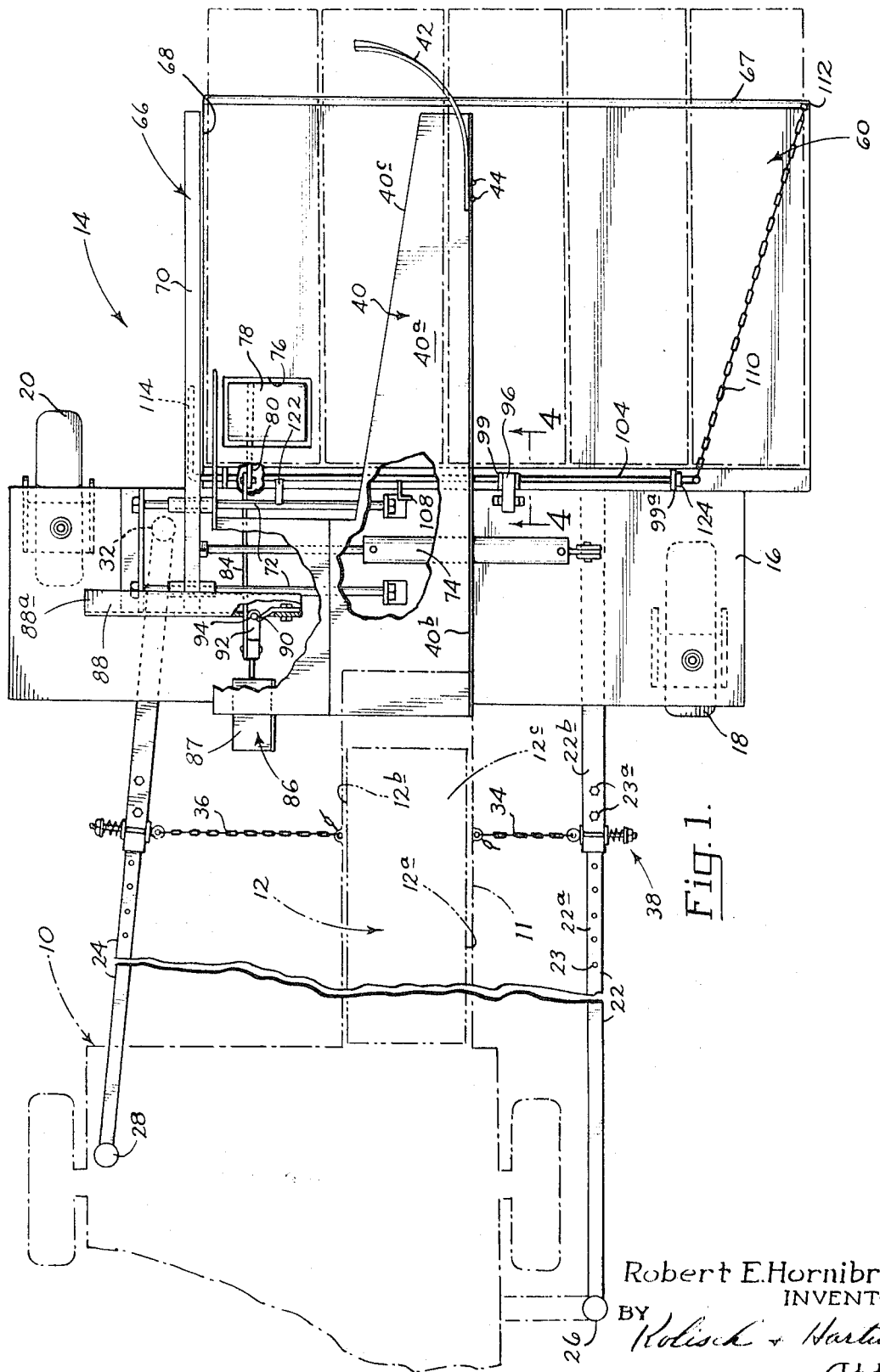

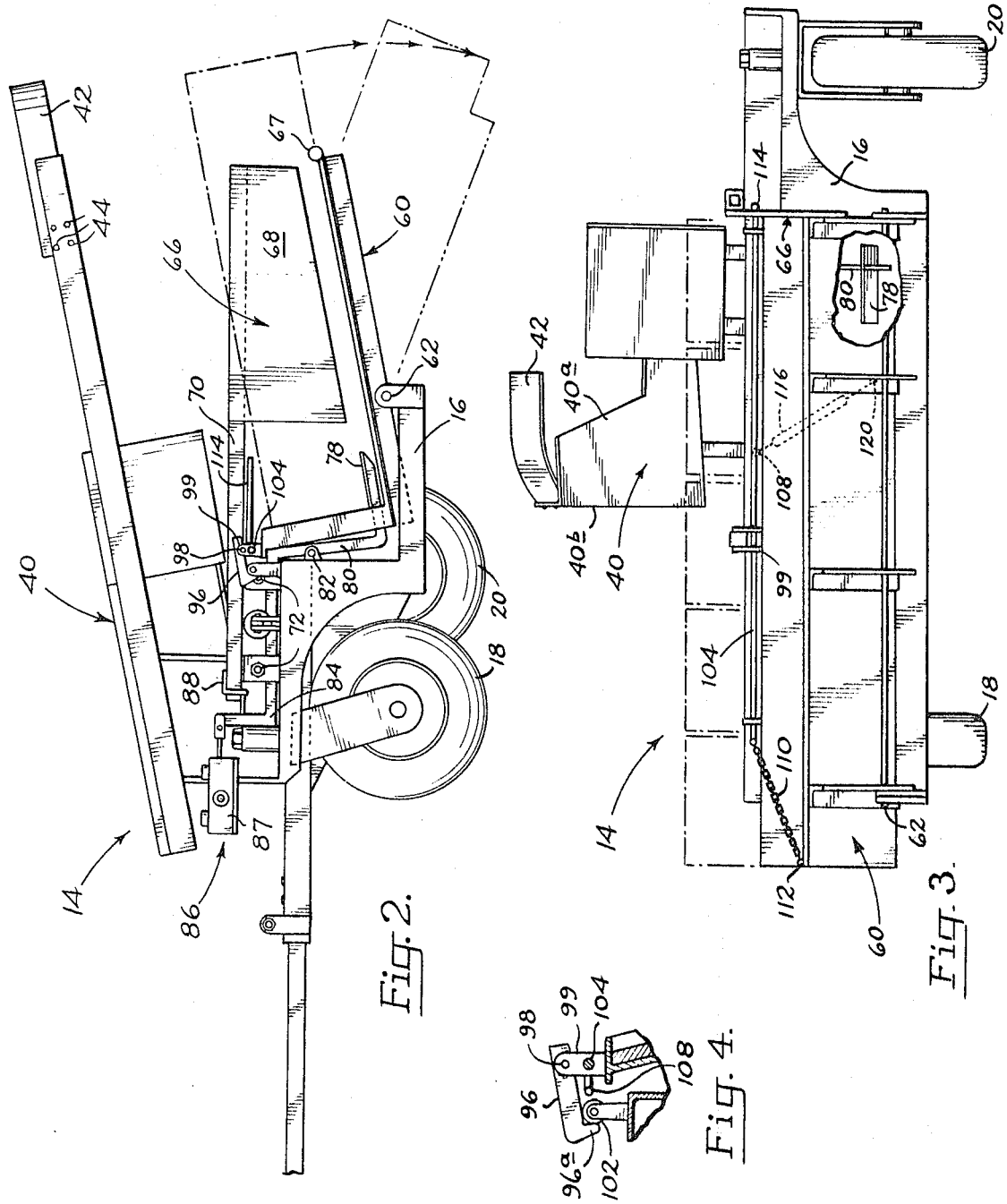

BALE ACCUMULATOR AND DISCHARGER

This invention relates generally to apparatus for accumulating bales produced by a traveling baler with such being grouped side by side while a accumulated and then dumped as a unit on the ground. The apparatus may be coupled in trailing relation behind a hay baler, and used to collect and then group multiple bales on the ground in a suitable position later to be picked up by clamp apparatus and deposited as a unit on a vehicle for hauling to another location.

A hay baler is a widely used piece of equipment which collects and compresses hay, usually then applying wire or twine to hold a bale together. Formed bales are ejected periodically from a discharge chamber in the baler as such travels over the ground, and each bale on being ejected normally then drops to the ground. In order to make a farming operation more efficient, this invention contemplates apparatus which collects and groups bales of hay as they come from the baler, and then dumps a multiplicity of bales at one location on the ground, where they then can be picked up all at once and put on a vehicle for transport or otherwise handled.

A general object of this invention is to provide such apparatus, referred to herein as an accumulator, which is relatively simple in construction and operates in a practical and reliable manner.

One feature of the invention is that bales are collected after giving each a quarter lateral turn from its original position on coming from the baler. This places the cut edge of the bale downwardly, the so-called hard edge or compacted edges of the bale upwardly, and the knots in the wire or twine holding the bale together on the side. The bales are grouped in this quarter-turned position, side by side, with the downwardly facing cut edges of the bales assisting in preventing the bales from prematurely sliding off the table. Mechanism is provided which dumps the bales after a predetermined number have been collected. With the bales having been given a quarter turn, they are in optimum position on being dumped for withstanding weathering when standing in the fields. With the bales turned prior to stacking, a group is formed which can be dumped on the ground without changing the relative position of the bales and without any further turning, as by merely sliding the bales off the accumulator, to produce a group in the field with each bale in the group in optimum condition to withstand weathering. The functioning of initially preturning each bale followed by grouping contributes significantly to obtaining simplicity in apparatus constructed to give the ultimate result of a group of bales having their cut edges facing downwardly.

Another object and feature of the invention is the provision of an accumulator where the various bales are grouped by moving them laterally on a tilt table, the bales assuming a position on the tilt table where rear ends protrude beyond a rear margin in the table. This positioning is a function of falling from a chute in the accumulator followed by subsequent side shifting through operation of bale shifter means. On dumping the bales, the tilt table is tilted so it inclines rearwardly and downwardly, which places the rear ends of all the bales in ground contact whereby all move off the accumulator at once on forward progress of the accumulator.

Another feature and object of the invention is the provision of such an accumulator which includes a frame and caster wheels supporting it for rolling movement over the ground, and novel means for coupling the accumulator through its frame to the drawing vehicle, which functions to keep an axis extending from front to rear in the accumulator in a predetermined position (normally parallel) to a similar axis in the drawing vehicle or baler on the baler making a turn. As a consequence, proper relative positioning between the chute in the accumulator which receives bales and discharge chamber in the baler is maintained. The caster wheels of the accumulator are offset with respect to each other, with one disposed forwardly of the other, and the means connecting the accumulator to the baler or drawing vehicle may comprise elongated forwardly projecting tongues which straddle the baler. These various features together serve to minimize relative motion between the accumulator and the baler which otherwise would occur on the equipment moving over uneven ground.

Yet another object of the invention is to provide such an accumulator which has a relatively low profile and good side-to-side stability. Further, the accumulator may be closely coupled to a baler. This permits the use of the apparatus on the side of a hill under conditions that would cause ordinary equipment to turn over laterally.

More specific and further objects of the invention comprise the provision of novel trip means actuated by a bale falling to a collecting table for starting operation of a bale shifter which then produces lateral shifting of the bale, and the provision of a novel collecting table for the bales, which tilts to produce dumping, in combination with a release which is actuated automatically on a predetermined number of bales being collected.

These and other objects and advantages are attained by the invention, which will become more fully apparent as the following description is read in conjunction with the accompanying drawings, wherein:

FIG. 1 is a plan view of an accumulator constructed according to an embodiment of the invention, and showing in dotted and dashed outline a hay baler which the accumulator trails;

FIG. 2 is a side view of the accumulator shown in FIG. 1;

FIG. 3 is a view looking at the rear end of the accumulator; and

FIG. 4 is a somewhat enlarged view taken generally along the line 4—4 in FIG. 1.

In the drawings, portions of a hay baler have been indicated in dot-dashed outline at 10. Hay balers are conventional, and the specifics of a given hay baler are not important to an understanding to the instant invention. For the purpose of the instant specification, it is sufficient to say that the baler is operable to take up hay formed in a window and then to compact such hay with such then forming an elongated bundle or bale such as the one shown at 12, usually of rectangular shape, which is directed endwise through a bale discharge chamber indicated at 11. In forming the bale, the bale is compacted along the side which faces the bottom of the page in FIG. 1, to form what is known as a hard side or edge, shown at 12a. The side opposite, or toward the top of the page in FIG. 1, is cut during the production of the bale, to form what is referred to as a cut edge, or side, 12b. The wire used to hold the bundle together is tied in knots disposed on the top side of the bale, which is the side facing the viewer in FIG. 1, and is designated at 12c, this side being referred to herein for convenience as the knot side.

When a bale of hay is left on the ground, the condition of the bale is best maintained if the bale is positioned with its hard side, or edge, 12a disposed upwardly, its cut edge, or side, 12b facing the ground and with its knot side 12c disposed on one side. This is because with the bale in this position, the knots are out of ground contact, which inhibits corrosion, oxidation and rotting by ground moisture of these knots. Water penetration of the bale is inhibited by the hard edge which faces upwardly. Absorption of water into the bale through the cut edge which faces downwardly is minimal.

The bale accumulator which travels behind the hay baler across the field and which turns, collects and then discharges a group of bales periodically is designated generally at 14.

In the specific embodiment of the invention illustrated, accumulator 14 takes the form of a vehicle which is towed in trailing relation behind the baler. Such includes a frame 16 and a pair of opposed castor wheels 18, 20 provided on opposite sides of the accumulator mounted under the frame and providing rolling support for the accumulator. It will be noted that the caster wheels are not in exact transverse alignment, but instead are offset slightly, with one disposed somewhat ahead of the other. The offset has been found to produce a leveling out of the riding of the equipment when traveling over uneven ground.

The accumulator is coupled to the hauling vehicle, i.e., the baler, through elongated laterally spaced tow bars, or tongues, shown at 22, 24. The forward ends of these tow bars are each connected through a ball-type hitch, resembling the usual ball trailer hitch, to a side of the baler. In FIG. 1, these ball-type hitches are shown at 26, 28.

It is important that there be minimal relative movement between the accumulator and the baler, in order that bales transfer properly from the bale discharge chamber to a chute (to be described) in the accumulator. Toward these ends, a connection is provided which maintains the axis extending from the front to the rear of the accumulator in a predetermined relative position, i.e., parallel, to a similar longitudinal axis in the baler, on the baler negotiating a turn. This result is achieved by mounting at least one of the tow bars, i.e., tow bar 22 in the construction shown, in a fixed position under frame 16, whereby it is prevented from lateral swinging. The other tow bar, i.e., bar 24, may have its rear end mounted through swivel mounting 32 to the frame, to permit lateral swinging movement of the forward end which better adapts the accumulator for coupling with balers of different sizes. With the accumulator coupled to a baler, and because of the fixing of bar 22, on the baler rounding a turn, the accumulator is swung in an arc while maintaining the alignment with the baler, with such movement accommodated by the caster wheels described earlier.

To stabilize further the accumulator and the baler, the tow bars may be connected, as by the chains 34, 36 shown, to the baler adjacent the latter's bale discharge chamber 12. These may be spring loaded, as demonstrated by the spring-loaded chain anchor 38 for chain 34, to provide some yieldability between the various parts.

Each tow bar comprises a pair of telescopic sections such as those shown at 22a, 22b for tow bar 22. Bores 23 and nut and bolt assemblies 23a permit fixing of the telescopic sections with different degrees of extension. The adjustability thus afforded further accommodates the coupling of the accumulator with different sizes and types of balers.

Further describing the accumulator, mounted in a elevated position on frame 16, with its forward end adapted to receive bales coming from the bale discharge chamber, is a chute 40. The chute (see FIG. 1) includes a base 40a and a side 40b and is operable to direct a bale rearwardly in the accumulator with such traveling endwise along the chute. Preferably, the base of the chute, in a transverse direction, is inclined slightly toward side 40b (see FIG. 3), whereby a bale on traveling along the chute will tend to gravitate into the corner defined by the side and base.

As best seen in FIG. 1, the floor of the chute has a diminishing width progressing rearwardly, by reason of the provision of inclined edge 40c which inclines toward the edge that joins with side 40b. Adjacent the rear of the chute, an adjustable fence plate 42 is provided jointed by fasteners 44 to chute side 40b. A bale on traveling along the floor 40a rearwardly in the chute receives less and less support for the side margin thereof which is opposite the side margin traveling along the side 40b. On contacting the fence plate, there is a lateral deflection of the bale which results in its falling from the chute while turning a quarter turn.

At the rear of the accumulator and extending transversely across it is an elongated tilt table, or platform, 60. The table is pivotally mounted adjacent its ends on the frame, as by pivot connection 62, which permits the platform to swing about a transversely extending horizontal axis. The platform has a raised, or storing, position illustrated in solid outline in FIG. 2, and is pivotable from this position to a lowered, or dumping, position, illustrated in dot-dashed outline in this FIG. The platform is spaced some distance below the discharge end of chute 40, and is used for storing bales dropping from the chute with such bales coming to rest on the platform after being subjected to a quarter turn. Along the rear margin of the tilt table a pipe or rounded protrusion 67 is provided which forms an upstanding ridge paralleling the rear margin.

Bale-shifter means, shown generally at 66, is included for shifting a bale on the platform laterally and toward one end of the platform to make room for a succeeding bale. Such bale-shifter means takes the form of a pusher plate 68 disposed on an arm 70 extending forwardly on the accumulator. Guide rods 72 slidably support the forward extremity of arm 70 for movement in a path extending between the sides of the accumulator, or parallel to the axis of the tilt table 60. Power-operated means, more specifically a hydraulic ram 74, with its rod end connected to arm 70, is actuatable to produce movement of the pusher under power.

As best seen in FIG. 1, the tilt table is apertured at 76, and disposed slightly above this aperture is a trip, or trip plate, 78. The trip plate is connected to an arm 80 journaled at 82 for limited swinging about a horizontal transversely extending axis. The upper end of arm 80 is connected to a valve actuator 84 mounted for fore and aft movement on the frame immediately to the rear of a valve 86 including housing 87. The connection is such that on a bale dropping on the trip plate to swing such downwardly and forwardly, this swings the upper end of arm 80 rearwardly with such accompanied with rearward movement of valve actuator 84.

As best seen in FIG. 1, joined to the forward extremity of arm 70 is an elongated angle piece 88 which parallels the path of the pusher plate. An ear 90 projecting through a cutout in the vertical wall of this angle piece, and joined to the angle piece, bends forwardly from the angle piece. Valve actuator 84 includes as an integral part thereof a shelf 92 upon which is mounted an upstanding pin 94.

Valve 86 is a conventional valve, and includes the usual hose connections (not shown) connecting it to opposite ends of ram 74 and also to the usual source of pressure fluid. Also part of the valve is the usual valve spool, which is spring biased within the valve housing to a retracted position within the housing. The spool in this position establishes fluid flow connections with ram 74 to produce extension of the ram. The valve spool when pulled to a fully retracted position out of the valve housing establishes fluid-flow connections to the ram whereby the ram retracts. The valve spool in an intermediate position between these two extremes shuts off fluid flow to the ram.

Assuming the parts as shown in FIG. 1, and upon a bale of hay striking the trip plate to move the valve actuator rearwardly, this fully extends the valve spool to initiate contraction of ram 74. The bale of hay which tripped the plate falls from chute 40 into a position immediately alongside pusher 68. With contraction of ram 74, the pusher contacts the bale and moves it laterally toward the opposite end of the table. The stroke of the ram is approximately equal to the width of a bale, and in this way, the bale is moved approximately the width of the bale over toward the opposite end of the table. With movement of the pusher and its arm 70, angle piece 88 also is shifted, with pin 94 now inside the angle piece because of the pulling out of the valve spool. On the angle piece having its end 88a moving completely beyond the pin a reversing action automatically occurs, with the spring within the valve housing serving the retract the valve spool to produce reverse flow, whereby the ram extends. This serves to return the pusher, and return movement continues until ear 90 comes into contact with pin 94 an the pin is deflected by the ear sufficiently to shift the valve spool to its neutral position. The cycle of operation may now be repeated with another bale falling onto the trip plate.

The tilt table is latched in its raised, or storing, position by a latch 96 (see FIGS. 1, 2 and 4) journaled at 98 on lug structure 99 projecting upwardly from the backwall of the tilt table. The forward end of the latch includes a downwardly projecting keeper flange 96a which fits over a roller 102 mounted on the frame of the accumulator.

A slide rod 104 mounted for rotation as well as endwise sliding movement in lug structure 99 has an offset actuating finger 108 (see FIG. 1) mounted on it projecting somewhat forwardly of the slide rod. One end of the slide rod is connected by chain 110 to an anchor 112 disposed on the tilt table. The other end of the slide rod terminates in a rearwardly extending arm 114. The slide rod is biased to the position of FIG. 1 by a tension spring 116 (see FIG. 3) that has one end anchored to the slide rod at finger 108 and its opposite end anchored to the back of the tilt table in the accumulator at 120.

Describing briefly the operation of the latch just outlined, as bales of hay are grouped side by side on the tilt table by the operation of the pusher, the first bale of hay to be deposited on the table is advanced in steps toward the end of the table where chain 110 extends. Eventually, this bale will contact the chain, and on further movement will pull the slide rod by bearing on the chain to shift arm 114 into the path of a bale falling down from chute 40. At the same time, offset actuating finger 108 is moved under latch 96. The next bale to fall from chute 40 strikes rod arm 114 to rotate it in a clockwise direction in FIGS. 2 and 4, with this resulting in lifting of the actuating finger and swinging upwardly of latch 96. On latch 96 swinging upwardly, the keeper flange moves off of roller 102. This frees the tilt table for tilting to its discharging position.

The tilt table is positioned with respect to chute 40 so that bales falling on it have their rear ends protruding some distance beyond the rear margins of the tilt table. With a full load of bales, and because of the location of the pivot connection 62, on release of the tilt table, gravity operates to swing the tilt table to its discharging position. The protruding ends of the hay bales are simultaneously brought into ground contact, and with forward movement of the baler and accumulator, the bales will be drawn off the tilt table ultimately to lie on the ground in the same position that they had when occupying the tilt table. With the load off the table, spring 116 performs the function of swinging the table back to its raised position, and also pulling and rotating the slide rod to return it to its original position. On returning to its original position, the slide rod is rotated slightly in a counterclockwise direction in FIG. 2, until the lug shown in FIG. 1 at 122 which is joined to the rod engages one of the guide rods 72. Endwise movement of slide rod 104 in a return direction is limited by stop 124 (see FIG. 1) which is joined to the slide rod coming into contact with lug 99a joined to the tilt table.

Describing generally the operation of the accumulator as a whole, bales move rearwardly from the bale discharge chamber 12, and as a bale is pushed toward the discharge end of chute 40, it falls from the chute to be turned a quarter turn, finally to come to rest on the tilt table. On striking the trip plate, the pusher is actuated to shift the bale laterally about the width of a bale. The bale when on the table has its hard edge up, its cut edge down and its knot side positioned vertically. Successive bales are dropped by chute 40 onto the trip plate to repeat the cycle of operation, until all but one bale of the full load to be collected has been stacked on the tilt table. The number of bales forming a full load is subject to variation depending upon the size of the unit. With but one bale to be received, the slide rod has been shifted to a position where rotation of the rod will cause release of the latch. On the next bale dropping from the chute, the latch is released and the full load of bales is deposited on the ground. When on the ground, all the bales have their hard edge up, their cut edge down, and their knot sides disposed vertically.

By turning the bales individually prior to grouping, no extensive handling of the entire group is required to obtain the desired position of the bales after their discharge. Further, the comparative softness of the cut edge of the bale is utilized effectively while the grouping of the bales is going on, to retain the bales on the tilt table while the rear ends of the bales project beyond the rear margin of the table. Further discussing this feature, each bale with its cut edge down comes to rest on the tilt table with protrusion 67 which extends along the rear margin of the table sinking into the comparatively soft cut ends on the now bottom sides. The bale becomes slightly indented where it extends over the protrusion, and this seated position on the protrusion continues as the bale is shifted laterally. While thus seated, inadvertent slipping of a bale off the rear margin of the table is inhibited. With the table swung to its lowered position, the extreme ends of the bales strike the ground, and the bales lift from the pipe to permit the bales easily to slide off.

Because all the bales are deposited at once, they are in optimum condition to be picked up by clamp apparatus and then moved to a vehicle for transport. The grouped form is with the bales side by side, which facilitates this type of pickup.

The bales are grouped in the accumulator at a location which is relatively low to the ground, and in a row which extends transversely between the sides of the accumulator. In this way, a relatively low center of gravity is obtained, with maximum lateral stability to inhibit turning over when the machine is used on a hill.

The apparatus contemplated has a relatively simple construction, which renders the same easy to maintain and repair.

In this specification, a particular embodiment of the invention has been described, but it is appreciated that changes and variations are possible without departing from the inventive concepts embodied within the invention.

I claim:

1. An accumulator adapted to be moved in trailing relation behind a traveling baler comprising a chute extending rearwardly in the accumulator supported in an elevated position over the ground adapted to receive bales traveling from the baler and direct such endwise and rearwardly in the accumulator to an elevated discharge end of the chute; said chute terminating at the discharge end thereof in bale turner means operable to discharge a bale with such falling laterally of the chute while subjected to a side turning; an elongated table extending between the sides of the accumulator and transversely of said chute and disposed beneath said turning, means; said table being positioned with respect to said turning means so that bales drop on the table with ends projecting rearwardly of the rear edge of the table and reach the table after having undergone a quarter turn; bale shifter means for moving bales discharged on said table laterally to one side of the accumulator and toward one end of the table whereby the bales become stacked side by side on the table with each turned a quarter turn from its original position on coming from the baler; means for dumping multiple bales simultaneously on their becoming stacked on said table comprising a tilt mounting for the table; said bale shift means comprising a power-operated upright pusher disposed adjacent the opposite end of the table from said one end and in advance of the bale with respect to how such is turned by said turning means, and the pusher on being actuated pushes the bale to the said one end of the table.

2. The accumulator of claim 1, which further includes a trip actuated by a bale falling to the table for starting said power-operated pusher.

3. The accumulator of claim 1, wherein said table has an upstanding ridge extending along its rear edge, and bales on dropping onto the table come to rest with their undersides resting on said ridge.